(12) United States Patent
Moriwaki (10) Patent No.: US 6,917,444 B1
(45) Date of Patent: Jul. 12, 2005

(54) IMAGE CORRECTION FOR COLOR IMAGE

(75) Inventor: Kagumi Moriwaki, Itami (JP)

(73) Assignee: Minolta Co., Ltd., Osaka (JP)

( * ) Notice: Subject to any disclaimer, the term of this patent is extended or adjusted under 35 U.S.C. 154(b) by 934 days.

(21) Appl. No.: 09/627,435

(22) Filed: Jul. 28, 2000

(30) Foreign Application Priority Data

Jul. 29, 1999 (JP) .......................................... 11-215131

(51) Int. Cl.$^7$ .............................. B41B 1/00; G03F 3/08
(52) U.S. Cl. ....................................... 358/1.9; 358/520
(58) Field of Search ........................ 358/1.9, 518, 515, 358/520, 519, 522; 382/167

(56) References Cited

U.S. PATENT DOCUMENTS

| | | | | |
|---|---|---|---|---|
| 4,926,247 A | * | 5/1990 | Nagasaki et al. | 348/262 |
| 5,172,224 A | * | 12/1992 | Collette et al. | 358/515 |
| 5,182,639 A | * | 1/1993 | Jutamulia et al. | 348/32 |
| 5,204,948 A | * | 4/1993 | Kato | 358/520 |
| 5,489,996 A | * | 2/1996 | Oku et al. | 358/518 |
| 5,612,795 A | * | 3/1997 | Dichter | 358/518 |
| 5,883,632 A | * | 3/1999 | Dillinger | 345/589 |
| 5,987,165 A | * | 11/1999 | Matsuzaki et al. | 382/162 |
| 6,393,148 B1 | * | 5/2002 | Bhaskar | 382/169 |
| 6,494,557 B1 | * | 12/2002 | Kato et al. | 347/19 |
| 6,580,825 B2 | * | 6/2003 | Bhaskar | 382/169 |
| 6,664,973 B1 | * | 12/2003 | Iwamoto et al. | 345/589 |

FOREIGN PATENT DOCUMENTS

| | | |
|---|---|---|
| JP | 8-32827 | 2/1996 |
| JP | 9-18727 | 1/1997 |
| JP | 11-146209 | 5/1999 |

\* cited by examiner

*Primary Examiner*—Madeleine Nguyen
(74) *Attorney, Agent, or Firm*—McDermott Will & Emery LLP (57) ABSTRACT

When a color image is corrected on data of lightness, saturation and hue, contrast is corrected based on lightness, and maximum saturation is determined at least based on lightness. Change in saturation is calculated according to the determined maximum saturations for the lightness before and after correction, and saturation is corrected with the change in saturation. Alternatively, saturation correction factor is set, and maximum saturation is determined at least based on lightness. Saturation correction quantity of each pixel is calculated such that a ratio thereof to the maximum saturation becomes the same by considering the saturation correction factor and the maximum saturation. The image is corrected with the saturation correction quantity.

10 Claims, 8 Drawing Sheets

IMAGE CORRECTION FOR COLOR IMAGE

This application is based on application No. 11-215131filed in Japan, the contents of which are hereby incorporated by reference.

BACKGROUND OF THE INVENTION

1. Field of the Invention

The present invention relates to data processing of digital image.

2. Description of Prior Art

A digital image is subjected to various kinds of image correction. Image correction is performed on various items such as lightness, saturation, sharpness and contrast.

When an image is dealt in a color space such as HSL space, the range of saturation (S component) depends on lightness (L component). Therefore, when saturation is converted, maximum saturation and lightness are taken into account. For example, in an apparatus described in Japanese Patent laid open Publication 9-18727/1997, by considering the difference in color reproduction range between input and output apparatuses, a color outside the color reproduction range is compressed to a color inside the color reproduction range, in order to keep the tone of an input image. Therefore, imaging direction is determined based on hue, lightness and saturation of input color. Especially for an image including colors of high saturation, color change in an output image is not noticeable.

In image correction, contrast correction using lightness component is known. However, it has a following problem. When lightness is increased in contrast correction, saturation seems to be decreased. Further, if the saturation is changed by the same amount for all lightness value, the saturation is observed differently, depending on lightness. Therefore, it is desirable to take saturation change into account in the contrast correction.

SUMMARY OF THE INVENTION

An object of the present invention is to provide an apparatus and a method for image processing which can correct contrast and saturation appropriately in image correction.

In an aspect of the invention, in an image processor for image correction on image data of lightness, saturation and hue, a contrast corrector corrects a value of lightness to change contrast of an image, and a maximum saturation determinator determines maximum values of saturation for the values of the lightness before and after the correction of said contrast corrector. Then, a saturation corrector corrects a value of saturation in accordance with the determined maximum values of saturation.

In another aspect of the invention, in an image processor for image correction on image data of lightness, saturation and hue, a setter sets saturation correction factor, and a maximum saturation determinator determines a maximum value of saturation for a value of lightness of each pixels. Then a saturation corrector corrects a value of saturation in accordance with the saturation correction factor and the maximum value of saturation determined above.

An advantage of the present invention is that it is suppressed that a pixel with enhanced lightness seems to be faded when contrast correction is performed according to lightness component.

Another advantage of the present invention is that the brightness of each pixel is not changed much after contrast correction according to lightness component.

A further advantage of the present invention is that change in brightness for each pixel seems similar when saturation is corrected.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
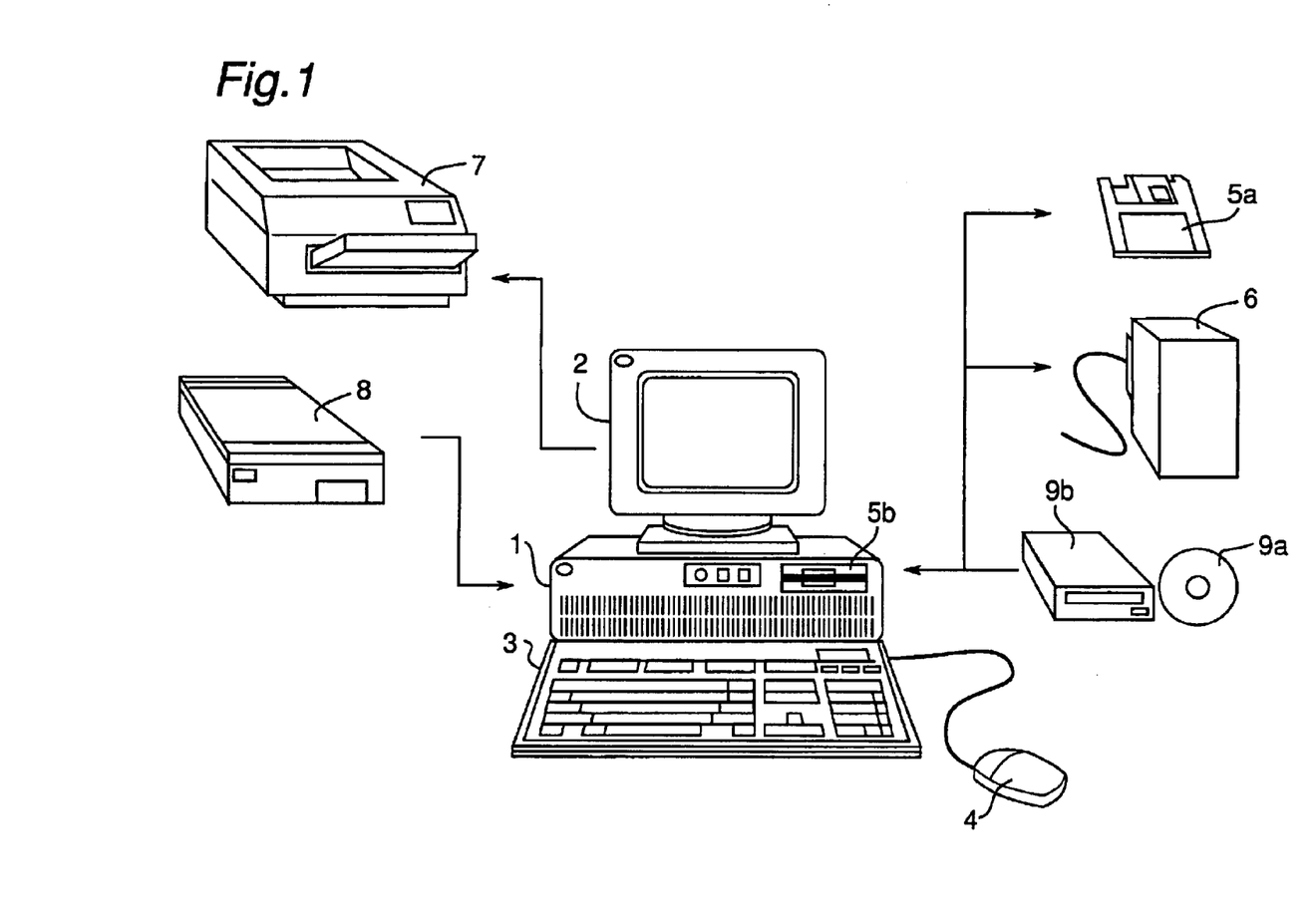
FIG. 1 is a diagram of an image processor.

Referring now to the drawings, wherein like reference characters designate like or corresponding parts throughout the several views, FIG. 1 shows an entire image processing apparatus according to an embodiment of the invention. In FIG. 1, arrows show directions of data flow. It has a controller (computer) 1 which controls the entire apparatus, as a central component. A display device 2 displays a various screen provided for operation or image processing as well as an image and characters. A keyboard 3 and a mouse 4 are used for various inputs and instructions by a user. A flexible disk 5 and a hard disk 6 are storage media for storing, for example, image data and programs. The apparatus has a flexible disk drive and a hard disk drive for accessing the flexible disk 5 and the hard disk 6. A printer 7 prints image data or the like on a paper. A scanner 8 reads image data of a document. A CD-ROM 9 is a storage medium for storing various data or programs, and the apparatus has a CD-ROM drive for accessing the CD-ROM 9. Programs explained later are read from an external recording medium such as a CD-ROM.

Figure 2:
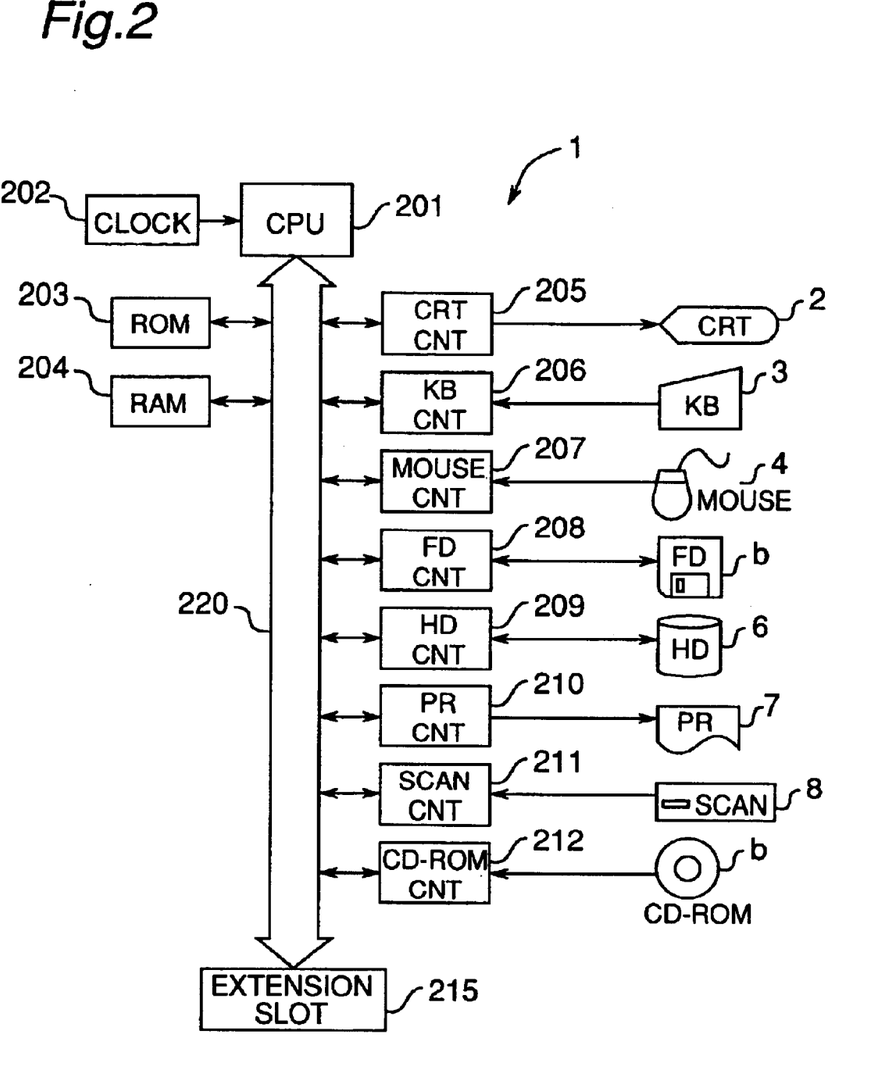
FIG. 2 is a block diagram of a controller and thereabout.

FIG. 2 is a block diagram of the controller 1 and thereabout. The controller 1 has a central processing unit (CPU) 210 connected via a bus 220 to a read-only-memory (ROM) 203 for storing various programs and a random access memory (RAM) for storing various data and programs. Further, it is also connected via the bus 220 to a display controller 205 for displaying images and characters in a screen of the display apparatus 2, a keyboard controller 206 for controlling key-input from the keyboard 3, a mouse controller for controlling an input from the mouse 4, a flexible disk controller 208 which controls the flexible disk drive, a hard disk controller 209 for controlling the hard disk 6, a printer controller 210 which controls outputs to the printer 7, a scanner controller 211 which controls the scanner 8, and a CD-ROM drive controller 212 which controls the CD-ROM drive. Further, a clock circuit 202 generates various clock signals for operating the apparatus. Extension slots 215 are connected to the bus 220 for connecting various extension boards to which for example a SCSI board is connected for connecting a hard disk drive, a scanner, a CD-ROM drive or the like. Further, it is also connected via an interface card to a network (web). In this apparatus, the flexible disk 5 and the hard disk 6 are used as storage media, but other medium such as a magneto-optical disk may also be used. The scanner 8 and the CD-ROM 9 are used for inputting image data, but an input device such as a still video camera may also be used. The printer 7 is used as an output device, but a digital copying machine or the like may also be used.

In image correction in this apparatus, image data are subjected to various kinds of image processing. The image correction includes correction of contrast and saturation. When a user instructs to start the image correction, an image correction routine is evoked. The image correction routine further includes image file input/output processing, image data display processing, a graphic user interface processing for image correction operation, error processing in the graphic user interface processing, and resolution change processing, but they are not explained here.

Figure 3:
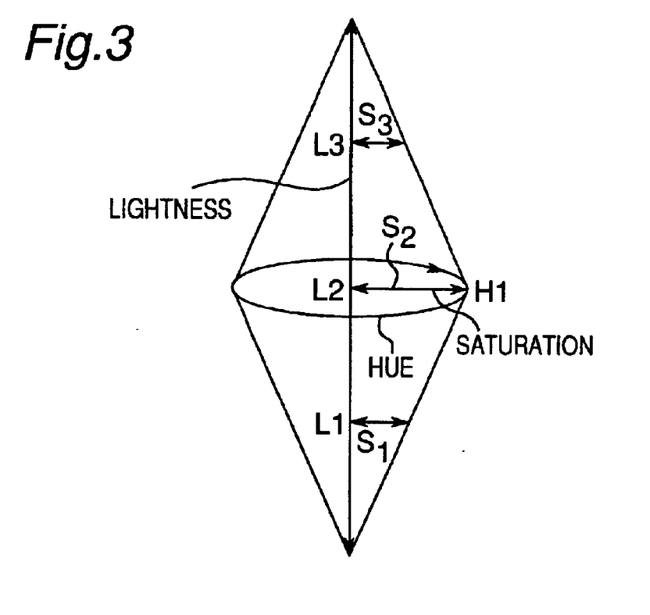
FIG. 3 is a diagram of HSL color space.

It is assumed here that color correction is processed in HSL color space. FIG. 3 shows HSL color space wherein S1 represents maximum saturation for lightness L1 and hue H1, S2 represents maximum saturation for lightness L2 and hue H1, and S3 represents maximum saturation for lightness L3 and hue H1. The maximum saturation represents a maximum of saturation for particular lightness and hue. It is understood in FIG. 3 that saturation varies with lightness.

Therefore, maximum saturation can be determined for lightness and hue, or at least according to lightness. Then, as will be explained later, combinations of lightness, hue and maximum saturation are stored in a table.

Figure 4:
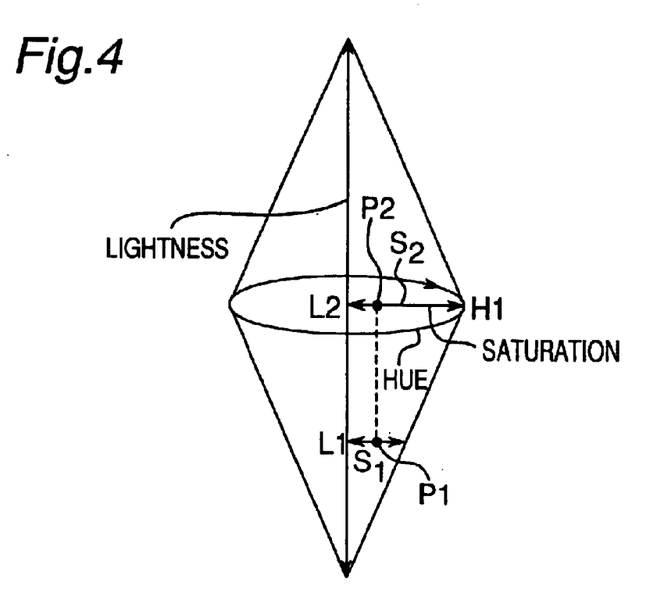
FIG. 4 is a diagram for explaining a problem on saturation when image is corrected in HSL color space.

Two problems on saturation which occur in the image correction in HSL color space are explained with reference to FIGS. 4 and 5. FIG. 4 shows that brightness seems deteriorated when saturation is not changed with lightness. In FIG. 4, P1 represents a point in HSL color space having lightness L1, hue H1 and saturation S, and P2 represents another point having lightness L2, hue H1 and saturation S after lightness component is corrected. As maximum saturation is changed from S1 to S2, a ratio of saturation S to maximum saturation is changed before and after correction, and it seems that brightness of the image is deteriorated after lightness component is corrected.

Figure 5:
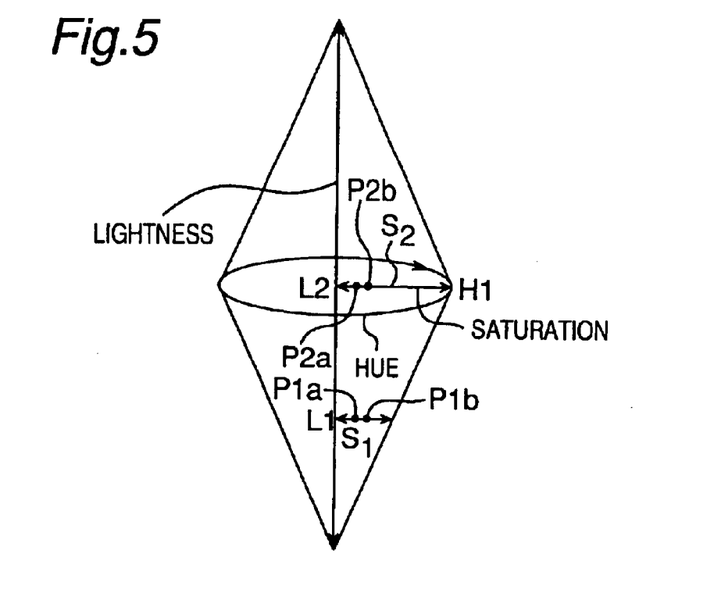
FIG. 5 is a diagram for explaining another problem on saturation when image is corrected in HSL color space.

FIG. 5 shows that when saturation is corrected by setting a constant correction amount α for each pixel, change in brightness is affected by the correction. A point P1*a* represents a point in HSL color space for a pixel having lightness L1, hue H1 and saturation S, and P1*b* represents another point having lightness L1, hue H1 and saturation S+α after the point P1*a* is corrected on saturation. A point P2*a* represents a point in HSL color space for a pixel having lightness L2, hue H1 and saturation S, and P2*b* represents another point having lightness L2, hue H1 and saturation S+α after the point P2*a* is corrected on saturation. Because the correction amount has a larger ratio to maximum saturation for P1*a* than for P2*a*, the point P1*a* seems more brighter.

Figure 6:
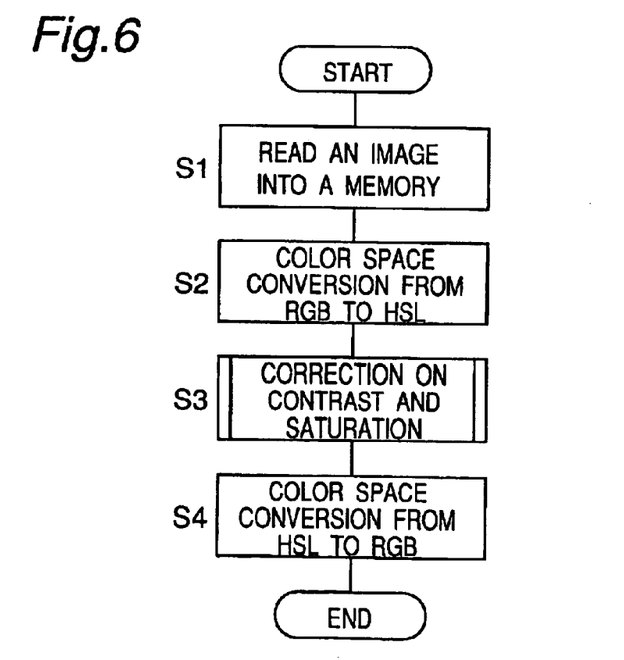
FIG. 6 is a main flowchart in a first embodiment of the invention.

FIG. 6 is a main flowchart by the controller 1 of the saturation correction according to lightness change. In order to prevent degradation of brightness due to lightness change, contrast is also corrected. That is, saturation correction is performed by considering lightness change due to contrast.

When the main flow is evoked, image data of an image are read into a memory (step S1). The image data are composed of a plurality of pixels, and each pixel has RGB data which represent density values of components of red (R), green (G) and blue (B). Next, the RGB image data converted to HSL data in color space conversion (step S2), and contrast and saturation are corrected on the HSL data (step S3, refer to FIG. 7). Next, the HSL data after the correction are converted to RGB data (step S4).

Figure 7:
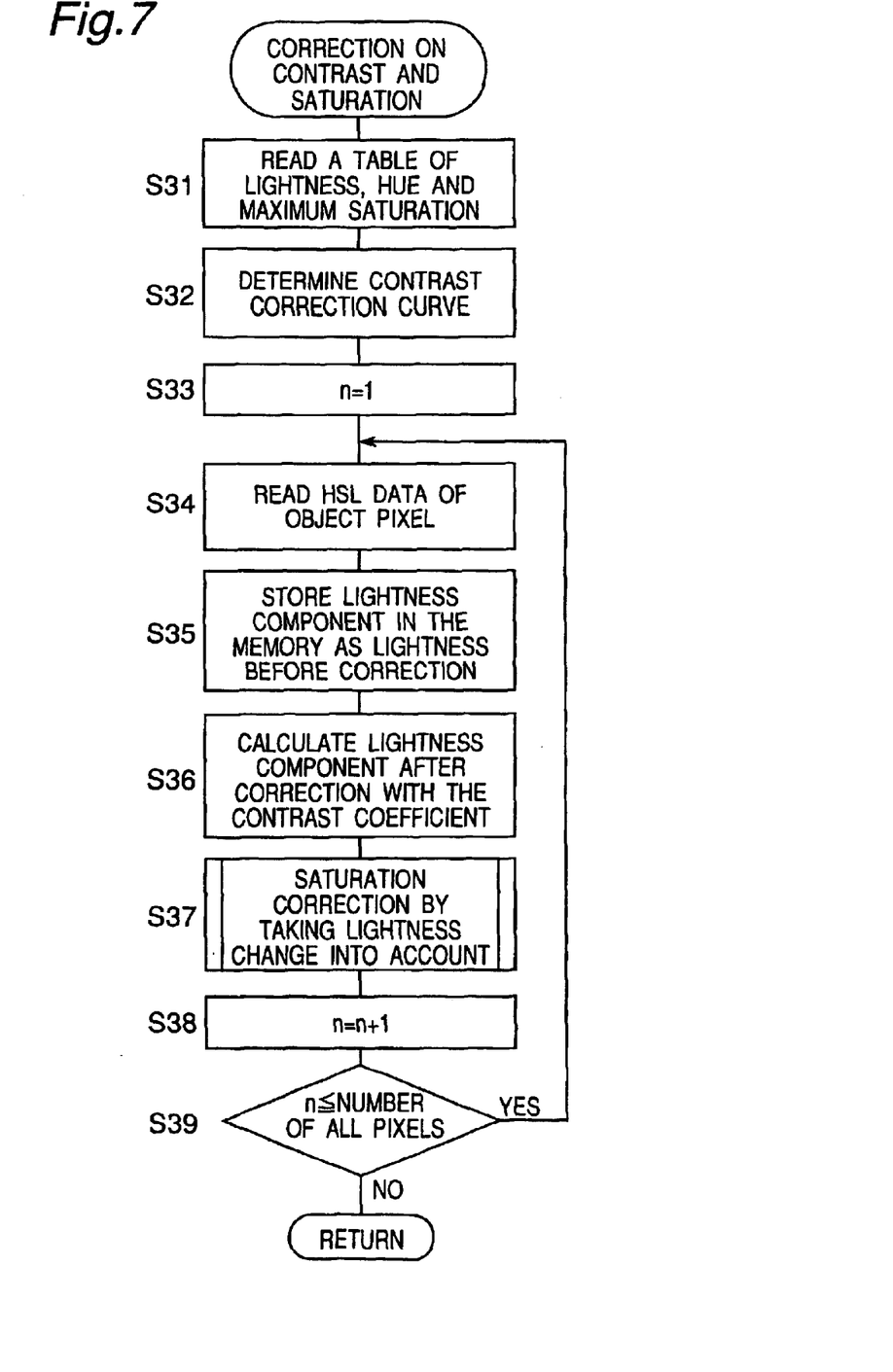
FIG. 7 is a flowchart of correction on contrast and saturation.

FIG. 7 is a flowchart of the correction of contrast and saturation (step S3 in FIG. 6). First, a table of lightness, hue and maximum saturation is read into the memory 204 (step S31). The table of combinations of lightness, hue and maximum saturation has been prepared in a file, and the file is read into the memory 204 in this step. Because saturation range depends on lightness, as explained above with reference to FIG. 3, combinations of lightness, hue and maximum saturation have been stored in the table, and they are used to determine maximum saturation at step S37 to be explained later. Next, a histogram of lightness component is prepared, and a contrast correction curve is determined (step S32). Next, a variable "n" which represents a pixel is set to 1 (step S33), so that an object pixel is an n-th pixel. Next, HSL data of the object pixel is read (step S34), and the lightness component is stored in the memory 204 as lightness before correction (step S35). Next, lightness component after correction is calculated with the contrast correction factor determined above (step S36), and saturation is corrected according to lightness change (Step S37). Next, the variable "n" is incremented (step S38), so that the object pixel is changed to a next pixel. The above steps S34–S38 are repeated until all the pixels are processed (or as far as "n" is equal to or smaller than the total pixel number (YES at step S39)).

Figure 8:
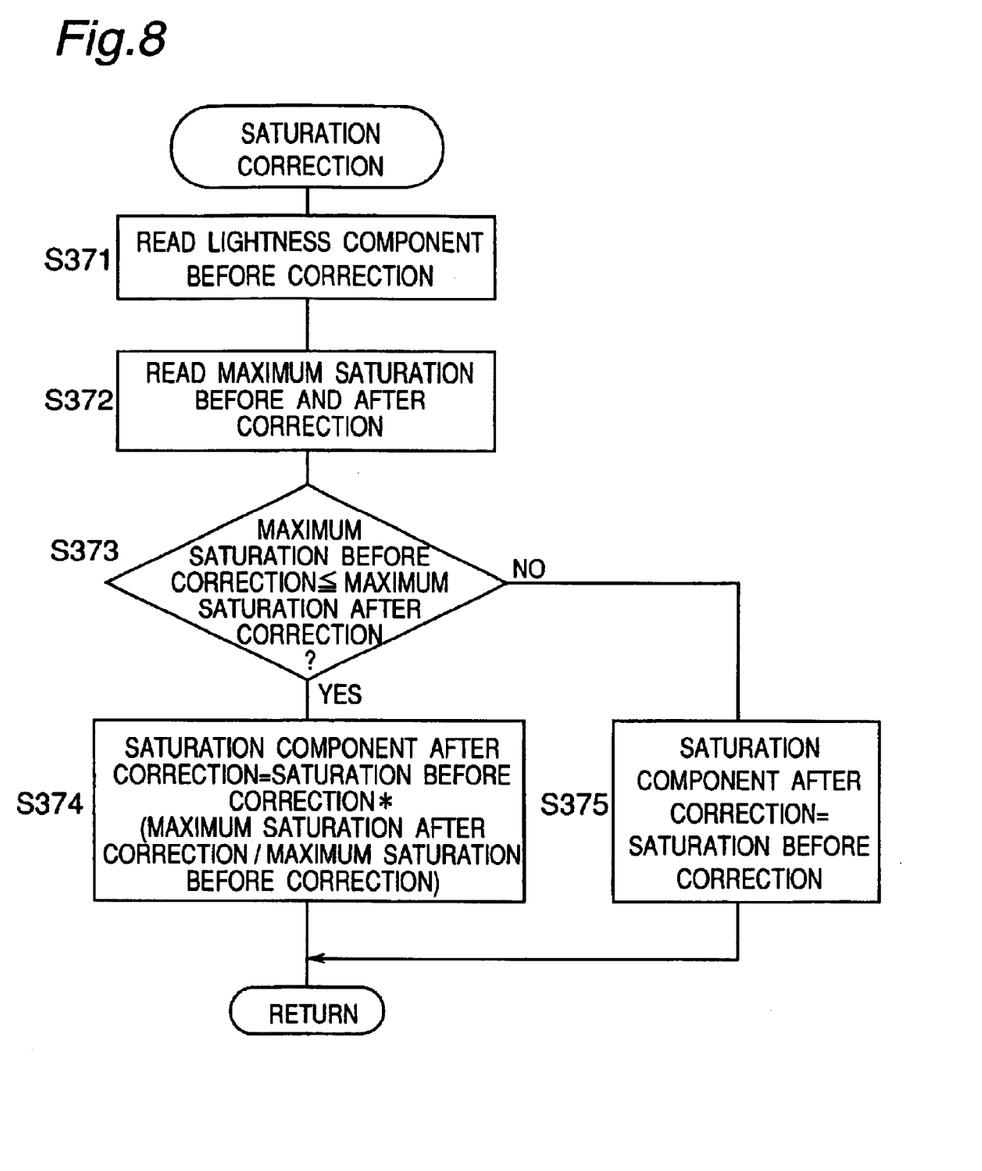
FIG. 8 is a flowchart of correction on saturation according to lightness change.

FIG. 8 is a flowchart of the saturation correction according to lightness change (step 337 in FIG. 7). First, the lightness component before correction stored in the memory 204 is read (step S371). Next, the maximum saturations before and after correction are acquired according to the lightness and hue before correction and the counterparts after correction, by referring to the table on lightness, hue and maximum saturation (step S372). Next, the saturation component after correction is determined by comparing the maximum saturations before and after correction (step S373). If the maximum saturation after correction exceeds that before correction, it is set to the maximum saturation before correction multiplied with a ratio of the maximum saturation after correction to that before correction. That is, (saturation after correction)=(saturation before correction)* (saturation after correction/saturation before correction). On the other hand, if the maximum saturation after correction is equal to or smaller than that before correction, saturation is not changed. The saturation has to be decreased according to the color space model, but saturation is not decreased because color seems to be faded after lightness is increased.

Next, a second embodiment of the invention is explained wherein a saturation correction factor is set for an image and maximum saturation is determined. Then, saturation of each pixel is corrected so that a ratio of the saturation to the maximum saturation becomes the same for each pixel based on the saturation correction factor and the maximum saturation. Then, after saturation is corrected, the brightness of each pixel seems to be changed similarly in the image. Therefore, the problem is solved in this embodiment that the brightness of each pixel would be observed differently in the image when the correction amount is constant.

Figure 9:
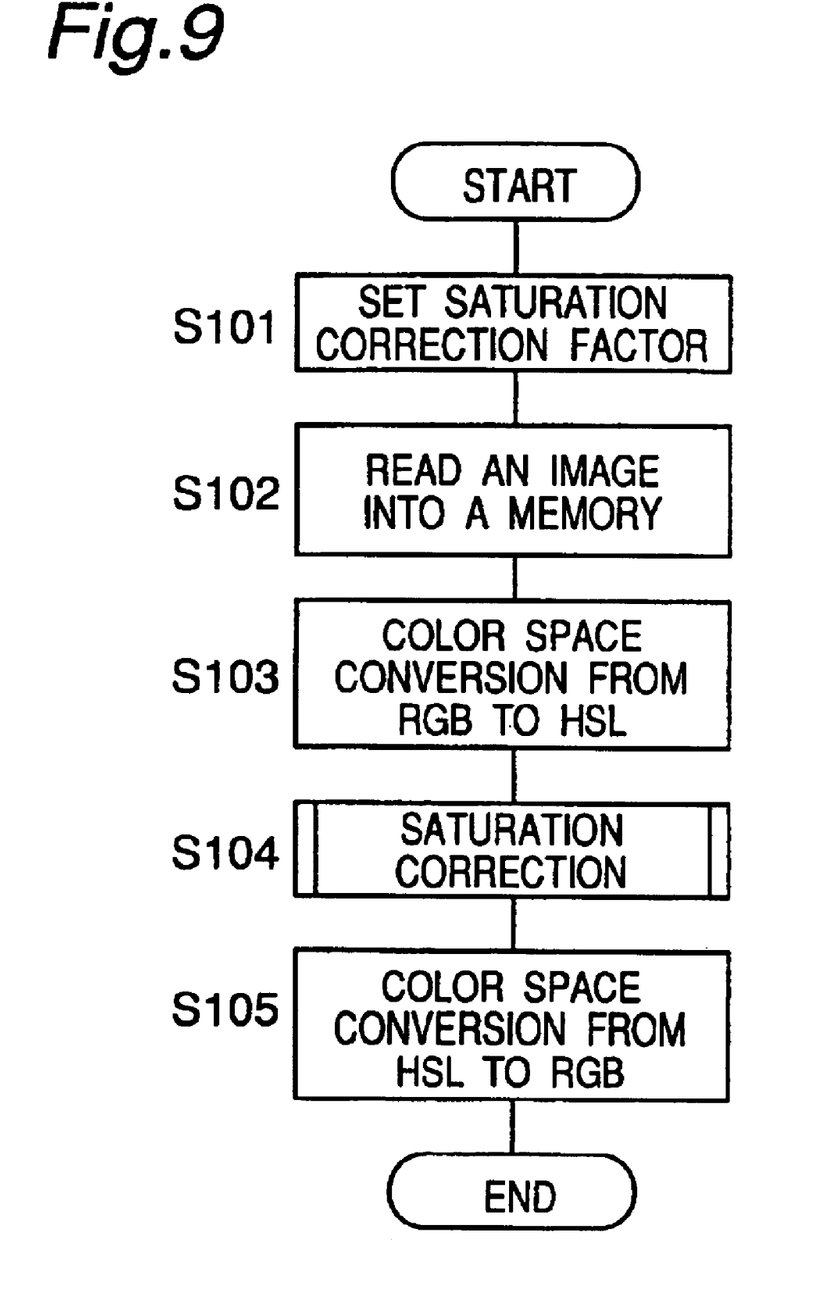
FIG. 9 is a main flowchart in a second embodiment of the invention.

FIG. 9 is a main flowchart by the controller 1 of the saturation correction in this embodiment. When the main flow is evoked, a saturation correction factor is set first (step S101). The factor may be set by a user or by the system with a predetermined value. Next, RGB image data of an image are read into a memory (step S101). Next, the RGB image data is read from the memory 204 (step S102). Next, color space conversion is performed from RGB data to HSL data (step S103). Next, saturation is corrected on the HSL data (step S104). Next, the HSL data after the correction are converted to RGB data (step S105).

Figure 10:
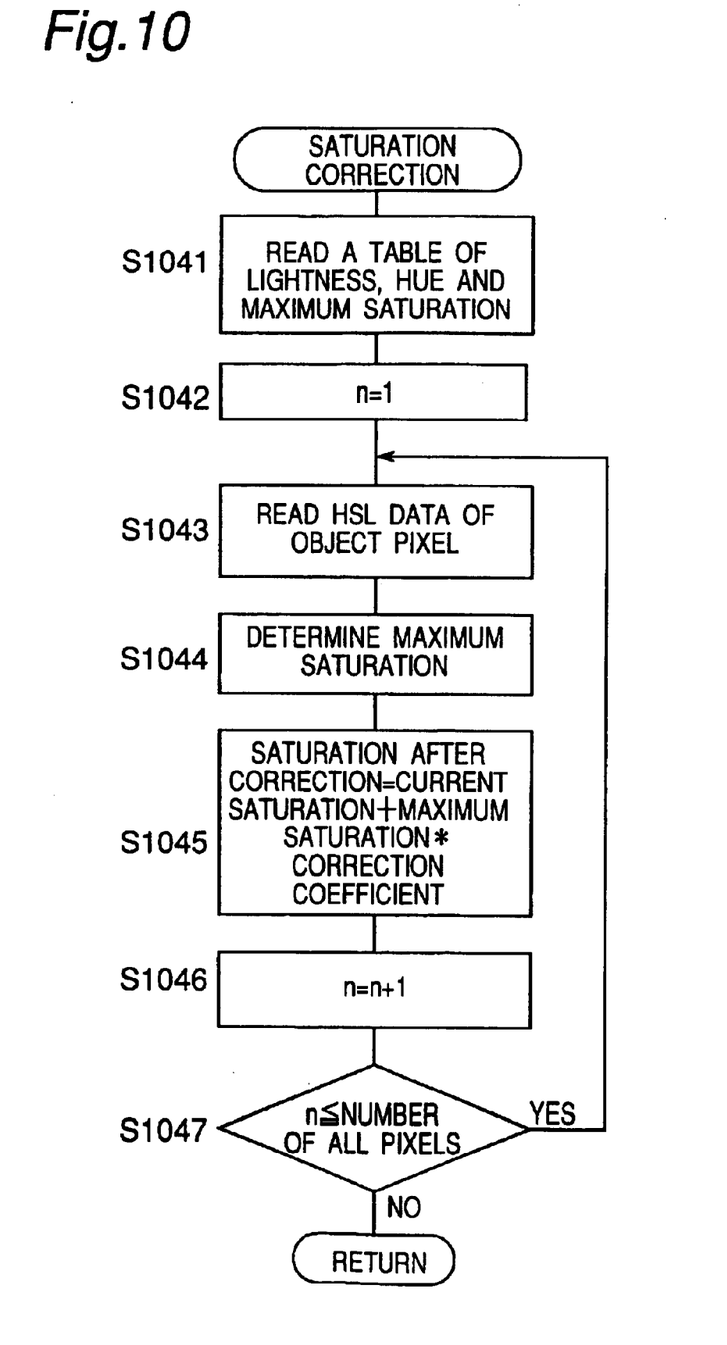
FIG. 10 is a flowchart of correction on saturation.

FIG. 10 is a flowchart of the correction of saturation (step S104 in FIG. 9). First, a table of lightness, hue and maximum saturation is read into the memory 204 (step S1041). The table of combinations of lightness, hue and maximum saturation has been prepared in a file, and the file is read into the memory 204 in this step. Next, a variable "n" which represent a pixel is set to 1 (step S1042), so that an object pixel is an n-th pixel. Next, HSL data of the object pixel is read (step S1043), and the maximum saturation of the object pixel is read (step S1044). That is, the maximum saturation in correspondence to the lightness and hue of the object pixel is acquired with reference to the table on the lightness, hue and the maximum saturation. Next, saturation after correction is calculated (step S1045), wherein a saturation correction factor is determined so that a ratio of the maximum correction quantity to the maximum saturation is kept the same for each pixel. That is, (maximum correction quantity)=(maximum saturation of the object pixel)* (saturation correction factor). Then, the saturation after correction is set to the current saturation plus the saturation correction quantity. Next, the variable "n" is incremented (step S38), so that the object pixel is changed to a next pixel. The above steps S1044–S1046 are repeated until all the pixels are processed (or as far as "n" is equal to or smaller than the total pixel number) (YES at step S1047).

The correction explained above is applicable not only to RGB image, but to Bayer image used inside a digital camera.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor, comprising:

a memory for storing image data of an image; and an image corrector for correcting lightness, saturation and hue of the image data stored in the memory, said image corrector including:

a contrast corrector for correcting a value of lightness to change contrast of the image; a maximum saturation determinator for determining maximum values of saturation for the values of the lightness before and after the correction of said contrast corrector; and a saturation corrector for correcting a value of saturation in accordance with said maximum values of saturation determined by said maximum saturation determinator.

2. The image processor as claimed in claim 1, wherein said saturation corrector calculates a ratio of the maximum value of the saturation after the correction to that before the correction and corrects the value of the saturation by using said ratio.

3. The image processor as claimed in claim 1, wherein said saturation corrector does not execute the correction when the maximum value of the saturation after the correction is smaller than that before the correction.

4. The image processor as claimed in claim 1, wherein said maximum saturation determinator has a table of values of hue, lightness, and maximum saturation and determines the maximum value of the saturation with reference to the table.

5. An image processing method for image correction, comprising:

reading image data of an image into a memory; and performing correction of lightness, saturation and hue of said image data in the memory including carrying out the steps of:

correcting a value of lightness to change contrast of the image;

determining maximum values of saturation for the values of the lightness before and after the correction in said step of correcting a value of lightness; and correcting a value of saturation in accordance with said maximum values of saturation determined in said determining step.

6. The image processing method as claimed in claim 5, wherein said step of correcting a value of saturation calculates a ratio of the maximum value of the saturation after the correction to that before the correction and corrects the value of the saturation by using said ratio.

7. The image processing method as claimed in claim 5, wherein said step of correcting a value of saturation is not executed when the maximum value of the saturation after the correction is smaller than that before the correction.

8. A computer program product comprising a computer usable medium, having encoded thereon a computer readable program for correcting lightness, saturation and hue of image data by performing the steps of:

correcting a value of lightness to change contrast of an image;

determining maximum values of saturation for the values of the lightness before and after the correction in said step of correcting a value of lightness; and correcting a value of saturation in accordance with said maximum values of saturation determined by said step of determining.

9. The computer program product as claimed in claim 8, wherein said step of correcting a value of saturation calculates a ratio of the maximum value of the saturation after the correction to that before the correction and corrects the value of the saturation by using said ratio.

10. The computer program product as claimed in claim 8, wherein said saturation correction step is not executed when the maximum value of the saturation after the correction is smaller than that before the correction.

* * * * *